3,301,810
ISOOLEFIN - MULTIOLEFIN COPOLYMERS THROUGH ULTRASONIC HOMOGENIZERS

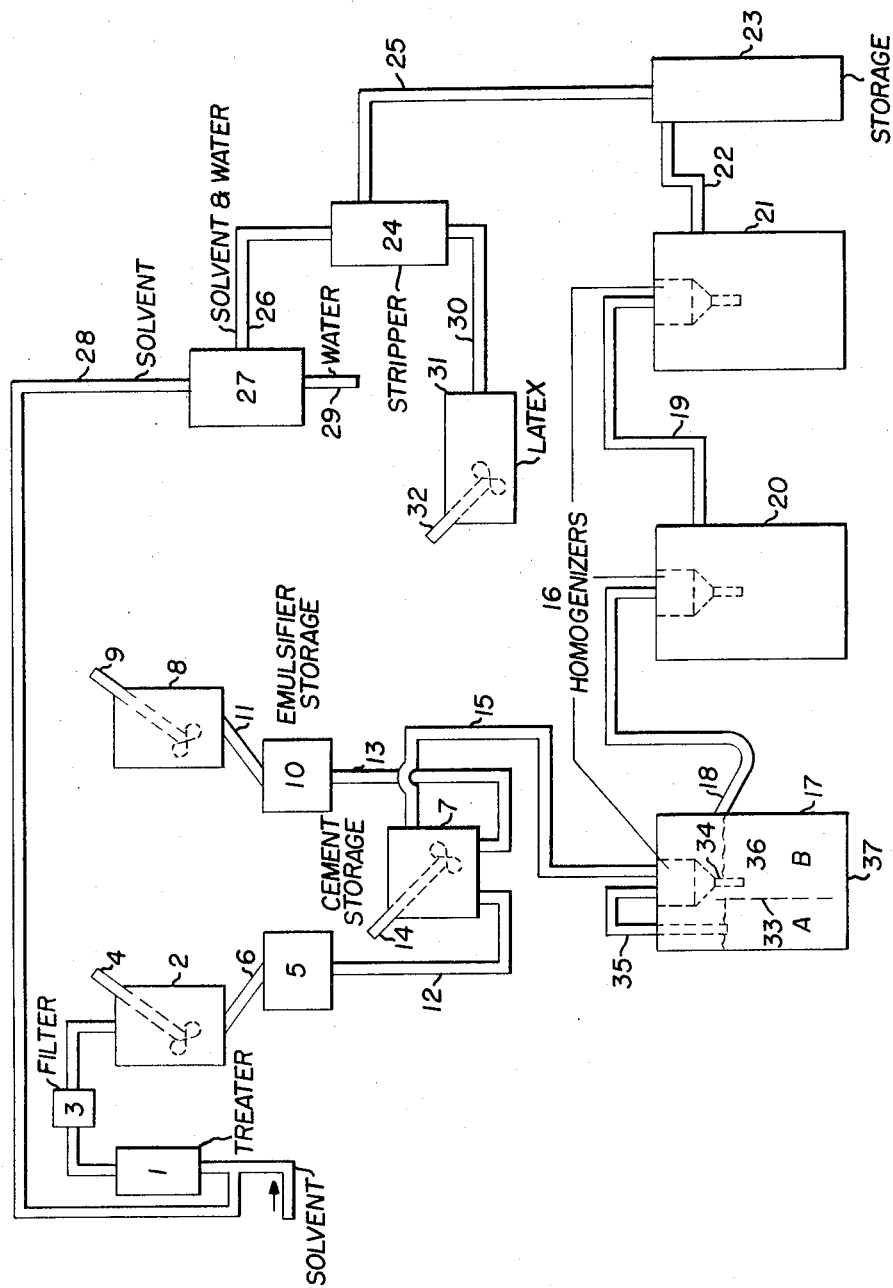

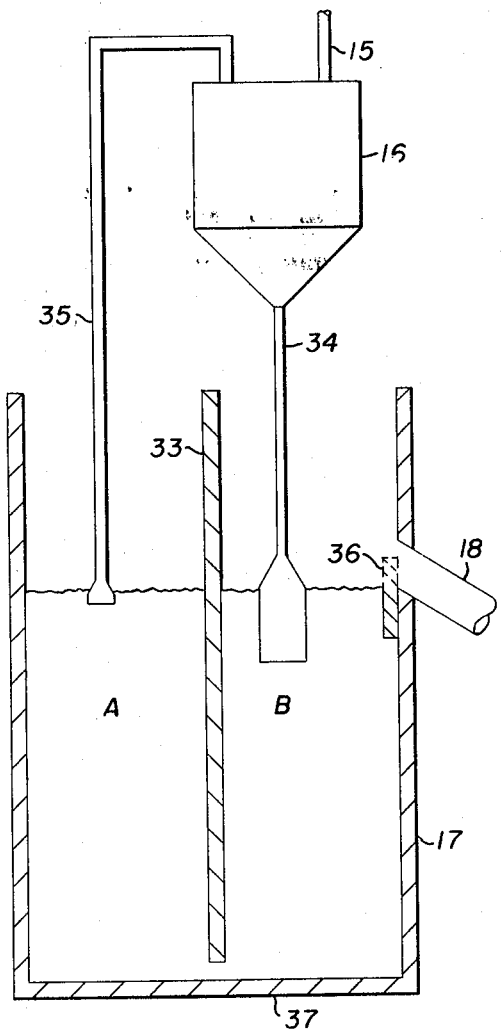
FIGURE-II

Edward Allen Hunter, Clyde Lee Aldridge, Merlan Meredith Lambert, and George Oliver Hillard, Jr., Baton Rouge, La., assignors to Esso Research and Engineering Company, a corporation of Delaware
Filed Mar. 24, 1961, Ser. No. 103,952
5 Claims. (Cl. 260—29.7)

This application is a continuation-in-part of Serial No. 643,456, filed March 1, 1956, now abandoned.

This invention relates to improvements in the preparation of rubber emulsions as well as an apparatus which can be used in the preparation thereof.

While various methods of preparing butyl rubber latices are disclosed in the literature, they are generally unstable and are otherwise unsatisfactory when stored or handled. It has now been found that excellent stability can be imparted by first blending a solution of butyl rubber in an aliphatic hydrocarbon, such as hexane, with water and an emulsifier and then passing the blend through a homogenizer. A further increase in stability can be obtained by recycling the emulsion through the homogenizer a critical number of times. Furthermore, it has been discovered that by adding dimethyl hexynediol to the emulsion before or during the stripping operation, the tendency of the latex to foam during this operation is decidedly reduced.

FIGURE I is a flowplan of a preferred embodiment of the invention.

FIGURE II shows diagrammatically a vertical section of one form of an apparatus that embodies certain features of the invention.

The rubbery polymers which come within the scope of the present invention are copolymers comprising 85 to 99.5 wt. percent of a monoolefin having from 4 to 6 carbon atoms, such as isobutylene, and 15 to 0.5 wt. percent of a multiolefin having 4 to 12 carbon atoms. The preferred multiolefins are conjugated diolefins, such as isoprene, butadiene-1,3, piperylene, myrcene and the like. Of these, isoprene is considered to be the best. Generally, the multiolefin is reacted with the monoolefin at a low temperature and in the presence of a dissolved Friedel-Crafts type catalyst. For instance, about 1.5 parts of isoprene are reacted with 98.5 parts of isobutylene in the presence of aluminum chloride at a temperature between about −30 and −260° F. The catalyst is added to the monomers in a dissolved form and the polymerization proceeds rapidly to yield the desired polymer in the form of a fluocculent white solid having many of the physical characteristics of raw gum rubber. When the polymerization has reached the desired stage, the material is conveniently recovered by discharging the whole mixture into (1) warm water which may contain an alcohol or other material to inactivate the catalyst, or (2) into a higher boiling organic solvent which dissolves the discrete butyl particles directly. The warm water or hot hydrocarbon solvent flashes off the excess refrigerant, unpolymerized olefins and catalyst solvent. In the case of slurrying with hot water, the polymer is recovered by straining or filtering or by other means and then dried. Before drying, the polymer has a Staudinger molecular weight from 15,000 to about 100,000 or more.

When starting with solid rubbery polymer, 100 parts by weight of the finely divided polymer is dissolved in between 200 to 800 parts by weight of an organic solvent at an elevated temperature, e.g., 100 to 120° F. When the solvent replacement process is used, the polymer is already in dilute solution which must be concentrated by stripping out some of the organic solvent. Suitable solvents are $C_6$ to $C_{20}$ hydrocarbon liquids such as hexane, heptane, octane, isooctane, nonanes, decanes, naphtha fractions, benzene, toluene, Solvesso 100 (a tradename of Esso Standard Oil Company for a solvent which is a substantially 100% aromatic hydrocarbon fraction boiling 315–350° F.) and Solvesso 150 (a substantially 100% aromatic hydrocarbon fraction boiling 365–415° F.), cyclohexane, and cyclohexene, etc., as well as carbon tetrachloride, trichloroethylene, carbon disulfide and the like. More volatile solvents can be used, but pressure equipment is required to minimize evaporation losses. When the solvent, such as commercial hexane, contains a mixture of compounds it is best to pass it through a bed of finely divided alumina (2 to 20 mesh), then through a bed of finely divided aluminum chloride and again through an alumina bed. If desired, the solvent may be filtered before it is mixed with the rubber.

Next, an aqueous solution, which may contain an emulsifying agent, stabilizer, foam depressor, etc., is mixed for an optimum period with the rubber cement in a vessel fitted with a high shear agitator, such as a Dispersator. Emulsifiers which are useful include sodium oleate, sodium lauryl sulfate, sodium oleyl taurate, etc., cationic emulsifiers such as diisobutyl phenoxyethoxyethyl dimethyl benzyl ammonium chloride, dimethyl phenoxyethoxyethyl dimethyl ammonium chloride, etc., and nonionic emulsifiers, such as the polyoxyethylated alkyl phenols. The nonionic emulsifiers may be used in combination with anionic or cationic emulsifiers. The total amount of emulsifier may vary between about 3 and 10 phr (parts per hundred parts of rubber). The amount of aqueous solution mixed with a cement, containing between 10 to 30 wt. percent polymer, will vary but, generally, the ratio of cement to aqueous solution will be between about 1 to 4:1. Between about 1 to 4 phr of polyvinyl alcohol may be included in the aqueous solution to act as a protective colloid. About 0.25 to 3 phr of a foam depressor, such as dimethyl hexynediol, may be included in the aqueous solution or added just prior to or during the stripping operation.

Next the resulting emulsion is passed through a homogenizing device. The ultrasonic homogenizers employed in this process may have a gear pump which forces the emulsion through an orifice with a pressure of about 200 to 700 p.s.i.a., and preferably between 400 and 500 p.s.i.a., and impinges the stream on a knife-edge vibrating blade enclosed in a resonating bell. The method of using these homogenizers is critical, since if a portion of the raw latex is allowed to pass through a homogenizer more than 5 times it tends to be less stable. On the other hand, if it is insufficiently homogenized the latex will form an undesirable amount of coagulum. The homogenizer must be so arranged that the latex passes through it at least twice but no more than 6 times, and preferably 3 to 5 times, to produce a latex having a particle size less than about 1 micron, e.g., 0.1 to 0.8 micron.

Experiments have shown that if raw butyl latex is recirculated through a Rapisonic Homogenizer, having both suction and discharge lines in an open tank, a poorer quality latex is made than if the material is pumped through the homogenizer via repeated once-through passes. The former method also requires a longer period of time to get the oil-phase in an emulsified state. However, by using a baffled tank and placing the suction and discharge lines of the homogenizer on opposite sides of the baffle, a once-through operation is simulated which eliminates sucking the immediately discharged material back into the homogenizer. In addition, since the coagulum, or oil phase, floats to the surface the successive homogenizer stages should suck from the liquid surface of the tank as well as having the preceding tank overflow a weir into the suction line of the succeeding homogenizer. By this method, the coagulum on both sides of the baffle is mixed with the rest of the latex.

These revisions, viz., (a) using a baffled tank, and (b) utilizing overflow with surface suction, cause a marked improvement in the quality of the raw latex, e.g. a lower percent coagulum, and a reduction in the time required to make a good raw latex in a continuous operation.

Further, since the number of passes of raw latex through the Rapisonic homogenizers has been shown to have a critical effect on the quality of raw latex produced, the weir height of the successive baffled tanks should be variable. Such an arrangement would very capably control the number of recycle passes taking place in each baffled tank. For example, when the height of the weir is just above the level of the ultrasonic homogenizer's discharge line, only a minor amount of latex will circulate under the baffle and return to the homogenizer. As the weir is raised above this position, a greater proportion of latex is recycled, the upper limit being just below the upper end of the vertical baffle. When a single baffle type vessel was compared with an ordinary recycling technique, it was found that latex from the baffle type vessel formed 0.1 vol. percent coagulum upon standing for 48 hours while the ordinary recycle technique produced a latex which formed 6.4 vol. percent coagulum. In both experiments, the butyl rubber solutions were homogenized for six minutes.

Referring now to FIGURE I, it shows an embodiment of the invention wherein butyl rubber was dissolved at about 110° F. in hexane in vessel 2. The hexane had been previously treated in vessel 1 with 2 to 20 mesh alumina and aluminum chloride. A filter 3 removed any solids from the hexane before it contacted the rubber. A stirrer 4 was used to increase the rate of solution. The rubber solution, or cement, which contained 23 wt. percent butyl rubber, was transferred to a storage vessel 5, by means of a line 6, and then added in metered quantities to dispersing vessel 7 wherein it was mixed with an aqueous solution which had previously been prepared in vessel 8. The aqueous solution consisted of the following ingredients:

| Ingredient: | phr |
|---|---|
| Oleic acid | 3.4 |
| Potassium hydroxide | 0.7 |
| Polyvinyl alcohol | 2.7 |
| Triton X-100 [1] | 3.1 |
| Water | 211.5 |

[1] A commercial polyoxyethylated octyl phenol containing 8 to 10 ethylene oxide units.

The PVA (polyvinyl alcohol) was added to about ⅛ of the total water and the resulting mixture was agitated by means of stirrer 9 for about 15 minutes. The oleic acid and potassium hydroxide were then added and the mixture was again stirred for a similar length of time. Lastly, the Triton X-100 was added and the whole mixture was agitated prior to and during the addition of the remaining water. This brought the total solids to 4.1 wt. percent. After the solution was prepared, it was introduced into a storage vessel 10 through line 11. 70 volumes of cement and 30 volumes of emulsifier solution were introduced into vessel 7 by means of lines 12 and 13, respectively, and the mixture was agitated for one hour with an efficient dispersing device 14. By so dispersing the cement and aqueous solution a mixture was obtained which had a lower viscosity, thus permitting ease of pumping and handling in the ultrasonic homogenizers. After mixing, the dispersion overflowed through line 15 to the top of the first of three ultrasonic homogenizers 16 in series. The homogenized solution or product was discharged into vessel 17 and removed by means of line 18 which is located near the liquid surface, and pumped into the top of the next homogenizer. The position of the outlet is important because one of its functions is to remove any coagulation on the surface of the latex in vessel 17.

Alternatively, as shown in FIGURES I and II, vessel 17 may have a vertical baffle 33 attached to the walls of said vessel which divides it into two compartments, A and B, and which is so positioned that its base is below the homogenizer's discharge line outlet 34 and yet above the floor 37 of vessel 17. The passageway defined by the baffle and the floor serves to circulate at least a part of the homogenized latex to the other side of the baffle. A recycle suction line 35, having its intake end located just below the surface of the latex in compartment A, returns the latex to the ultrasonic homogenizer 16. The level of the liquid in vessel 17 is regulated by raising and lowering an overflow weir 36 located at the mouth, or intake end, of line 18 through which the product is discharged.

Line 19 removes the raw latex from vessel 20 and introduces it into the homogenizer in vessel 21. The homogenizers used were Rapisonic Homogenizers marketed by the J. H. Day Co. They have an approximately elliptical orifice of 0.180×0.060 inches. The pressure drop across the orifice was about 500 p.s.i. and the raw latex passed through it at a rate of 4.5 gallons per minute. The raw latex was then pumped by means of line 22 to a storage vessel 23 and then to a batch stripper 24 through line 25. The hexane was removed by heating the raw latex to 130° F. at 26 inches of mercury absolute pressure and holding it there for 6–12 hours. A portion of the water was removed by dropping the pressure to 15 inches of mercury absolute pressure and heating the raw latex for 6–12 hours at 175° F. The hexane and water were taken overhead by means of line 26 and separated in settling tank 27; the solvent was recycled to vessel 1 through line 28 and the water was removed through line 29. The finished latex was removed from the stripper through line 30 and stored in the vessel 31 which is equipped with a stirrer 32 to prevent creaming.

*Example I*

Three liters of water containing 3.42 g. KOH, 13.68 g. Triton X-100, 11.37 g. Polyvinylalcohol, were circulated continuously through a "Rapisonic" homogenizer. During the circulation there was bled into the intake line of the Rapisonic 3 liters of a butyl rubber in hexane solution (169 g. rubber/liter) containing 17.1 g. oleic acid. The addition of the butyl solution required 5.5 minutes. Following this addition period, the total mixture was recycled through the Rapisonic. The operation was interrupted at intervals to take samples. These samples were held for 48 hours in closed containers and then inspected for volume of coagulation as a measure of latex instability. These data are tabulated below.

| Sample No. | Cc. Coagulum per 1,000 cc. Sample | Coagulation, Vol. Percent on Latex | No. of Rapisonic Cycles |
|---|---|---|---|
| Ia | 69 | 6.9 | *10.5 |
| Ib | 44 | 4.4 | 14.6 |
| Ic | 42 | 4.2 | 19.7 |
| Id | 53 | 5.3 | 26.5 |
| Ie | 60 | 6.0 | 36.7 |

*Prior to this number of cycles with Rapisonic alone a large portion of the oil phase was not even dispersed.

*Example II*

To illustrate the critical effect of the number of passes on the quality of the latex, 10 liters of a 23 weight percent solution of butyl rubber-in-hexane was blended for 30 minutes with 10 liters of water containing 60 grams of potassium oleate, 52.5 grams of Triton X-100 (polyoxyethylated p-octyl phenol) and 45.6 grams of polyvinyl alcohol in a 10 gallon tank with a dispersator agitator which was rotated at 4000 r.p.m. The resulting dispersion was then passed once through the Rapisonic homogenizer described above. The last step was repeated several times, taking a sample after each pass. These samples were allowed to stand in a closed vessel for 48 hours at room temperature and the amount of coagulum formed was measured. The data are set forth below:

TABLE I

| No. of passes: | Coagulation, vol. percent on latex |
|---|---|
| 1 | 3.3 |
| 2 | 0.6 |
| 3 | 0.2 |
| 4 | 0.1 |
| 5 | 0.1 |
| 6 | 1.0 |
| 7 | 7.0 |

A comparison of the data from Examples I and II show that much less coagulum is obtained when the emulsion is first blended in a dispersator. The data of Example II further show the number of subsequent passes through the homogenizer is critical, and that if the latex passes through the homogenizers more than 6 times the latex becomes unstable.

After homogenization of the raw latex, the solvent may be removed under 26 inches of mercury absolute pressure between about 70 and 160° F. either batchwise or in staged continuous strippers. The stripping temperature is generally between 130 and 160° F. under about 25 to 30 inches of mercury absolute pressure. If desired, a part of the water may be removed at a temperature between about 70 and 200° F. under from about 1 to 25 inches of mercury absolute pressure. Also, in one embodiment of this invention, a foam suppressor is sprayed on, or otherwise contacted with the raw latex, during the stripping operation. While any of the known foam depressors may be used, it is preferred to use dimethyl hexynediol.

About 1 to 10 phr of a creaming agent, such as casein, carboxy methyl cellulose, alginate, etc., may be added to the latex either before or after the stripping step to produce a more enriched latex. The latex generally contains 25 to 55 weight percent total solids, and with the use of creaming agents, and/or water stripping, latices in the range 40 to 55 weight percent solids are obtained.

*Example III*

When 2 liters of a 23 weight percent butyl rubber-in-hexane solution was emulsified with 800 ml. of water containing 11.6 grams of oleic acid, 2.6 grams of potassium hydroxide, 5.3 grams of Triton X–100, 9 grams of polyvinyl alcohol and 3.4 grams of dimethyl hexynediol and the solvent was stripped at 160° F. and atmospheric pressure, little foaming was observed during handling and stripping of the latex while a control latex containing no dimethyl hexynediol produced a relatively larger amount of foam.

The latices obtained in accordance with this invention are suitable for use in the preparation of foam rubber sponge extenders, paper size, paper shades and drapes, tire cord coating compositions, emulsion paints, laminant for paper, wood, canvas, and plywood, binder for cork, wood, fiber and leather buffings, industrial gloves and protective clothing, dipped goods and adhesives.

In the appended claims it is intended to claim all novelty inherent in the invention as well as all modifications coming within the scope and spirit of the invention.

We claim:

1. In a process for preparing a latex of a rubbery copolymer comprising 85–99.5 wt. percent of an isoolefin having 4 to 6 carbon atoms and 15–0.5 wt. percent of a multiolefin having 4 to 12 carbon atoms wherein the copolymer is dissolved in an organic solvent and preliminary dispersed with an aqueous solution containing an emulsifying agent to form a crude dispersion, the improvement which comprises intimately mixing and simultaneously comminuting the components of the resulting crude dispersion by passing said dispersion through an ultrasonic homogenizer at least twice, but not more than six times, stripping off the solvent and recovering a stable latex having a particle size of 0.1 to 1 micron.

2. A process according to claim 1 in which the aqueous solution contains dimethyl hexynediol.

3. A process for preparing a latex which comprises dissolving 100 parts by weight of a rubbery copolymer comprising 85–99.5 wt. percent of isobutylene and 15–0.5 wt. percent of a conjugated diolefin having 4 to 12 carbon atoms in 200 to 800 parts by weight of a $C_{6-20}$ hydrocarbon solvent, preliminarily dispersing between about 1 to 4 volumes of the rubber solution with 1 volume of an aqueous solution containing 3 to 10 parts by weight of an emulsifier to form a crude dispersion, homogenizing the crude dispersion from two to five times to reduce the copolymer's average particle size to less than one micron and heating the homogenized dispersion under reduced pressure to a temperature between about 70 and 160° F. to remove the solvent.

4. A process according to claim 3 in which a foam suppressor is sprayed into the dispersion during the heating step.

5. A process according to claim 3 in which dimethyl hexynediol is sprayed into the dispersion during the heating step.

References Cited by the Examiner

UNITED STATES PATENTS

| 2,912,401 | 11/1959 | Aldridge et al. | 260—29.7 |
| 2,916,265 | 12/1959 | Towne | 259—1 |
| 2,936,295 | 5/1960 | Brodkey et al. | 260—29.7 |
| 2,944,038 | 7/1960 | Hunter et al. | 260—29.7 |
| 2,955,094 | 10/1960 | Brodkey et al. | 260—29.7 |
| 2,960,317 | 11/1960 | Bodine | 259—1 |
| 2,997,447 | 8/1961 | Russell et al. | 252—358 |

MURRAY TILLMAN, *Primary Examiner.*

L. J. BERCOVITZ, D. J. ARNOLD, *Examiners.*

R. N. COE, E. B. WOODRUFF, *Assistant Examiners.*